United States Patent
Hayden et al.

(10) Patent No.: US 9,567,749 B2
(45) Date of Patent: Feb. 14, 2017

(54) MODULAR STRUCTURAL COMPOSITE BEAM

(71) Applicant: Blade Dynamics, Ltd., Cowes, Isle of Wight (GB)

(72) Inventors: Paul Trevor Hayden, Cowes (GB); Harald Behmer, Newport (GB)

(73) Assignee: Blade Dynamics Limited, Southhampton, Hampshire (GB)

( * ) Notice: Subject to any disclaimer, the term of this patent is extended or adjusted under 35 U.S.C. 154(b) by 0 days.

(21) Appl. No.: 14/010,975

(22) Filed: Aug. 27, 2013

(65) Prior Publication Data

US 2013/0340384 A1 Dec. 26, 2013

Related U.S. Application Data

(63) Continuation of application No. 13/663,296, filed on Oct. 29, 2012, now Pat. No. 8,905,718, which is a (Continued)

(30) Foreign Application Priority Data

Apr. 30, 2010 (GB) .................................. 1007336.9

(51) Int. Cl.
*E04C 3/29* (2006.01)
*B29C 70/86* (2006.01)
(Continued)

(52) U.S. Cl.
CPC .............. *E04C 3/29* (2013.01); *B29C 70/865* (2013.01); *B29D 99/0003* (2013.01); (Continued)

(58) Field of Classification Search
USPC ............... 52/648.1, 650.1, 651.11, 831, 834, 837, 52/839, 841, 843, 847, 854; 416/224, 226, 416/230; 244/127.8, 127.7, 123.1, 123.2, 123.3, 244/123.4, 123.5, 123.9, 124; 29/897, 897.2, 29/897.35, 897.3, 897.31, 419.1
See application file for complete search history.

(56) References Cited

U.S. PATENT DOCUMENTS 2,410,609 A * 11/1946 Pecker .................. B64C 27/473
244/123.3
3,487,518 A 1/1970 Hopfield
(Continued)

FOREIGN PATENT DOCUMENTS

WO WO 97/30651 8/1997
WO WO 2005/011964 2/2005

OTHER PUBLICATIONS

International Search Report and Written Opinion issued on Sep. 21, 2011 in related PCT Application No. PCT/GB2011/000661.
(Continued)

*Primary Examiner* — Jessica Laux
(74) *Attorney, Agent, or Firm* — Dority & Manning, P.A.

(57) ABSTRACT

A modular fiber reinforced plastic flange for a structural composite beam which comprises a body formed of a plurality of elongate elements arranged in an array, wherein the dimensions of the body are substantially determined by the number and arrangement of the elongate elements in the array, and a skin member at least partially surrounding the array. Also, a structural composite beam comprising the modular fiber reinforced plastic flange and a shear web connected to the skin member of the modular flange. A method of making the modular flange and beams, and a kit of parts for making the modular flange are also disclosed.

13 Claims, 4 Drawing Sheets

Related U.S. Application Data continuation of application No. PCT/GB2011/000661, filed on Apr. 28, 2011.

(51) Int. Cl.

| | | |
|---|---|---|
| *F03D 1/06* | (2006.01) | |
| *B29D 99/00* | (2010.01) | |
| *B29K 105/24* | (2006.01) | |
| *B29L 31/00* | (2006.01) | |
| *B29L 31/08* | (2006.01) | |

(52) U.S. Cl.
CPC .......... *F03D 1/065* (2013.01); *B29K 2105/24* (2013.01); *B29K 2105/243* (2013.01); *B29L 2031/003* (2013.01); *B29L 2031/082* (2013.01); *F05B 2280/6003* (2013.01); *F05B 2280/6013* (2013.01); *F05B 2280/702* (2013.01); *F05C 2253/04* (2013.01); *F05C 2253/16* (2013.01); *F05C 2253/22* (2013.01); *Y02E 10/721* (2013.01); *Y02P 70/523* (2015.11); *Y10T 29/49616* (2015.01); *Y10T 29/49826* (2015.01)

(56) References Cited

U.S. PATENT DOCUMENTS

| | | | |
|---|---|---|---|
| 3,531,901 A | 10/1970 | Charles, Jr. et al. | |
| 4,580,380 A | 4/1986 | Ballard | |
| 4,643,646 A * | 2/1987 | Hahn et al. | 416/226 |
| 4,662,587 A * | 5/1987 | Whitener | 244/117 R |
| 4,732,542 A * | 3/1988 | Hahn et al. | 416/226 |
| 4,752,513 A | 6/1988 | Rau et al. | |
| 5,735,486 A * | 4/1998 | Piening et al. | 244/124 |
| 6,287,666 B1 * | 9/2001 | Wycech | 428/122 |
| 6,295,779 B1 | 10/2001 | Canfield | |
| 6,332,301 B1 | 12/2001 | Goldzak | |
| 7,371,304 B2 * | 5/2008 | Christman et al. | 156/293 |
| 7,625,185 B2 * | 12/2009 | Wobben | 416/229 R |
| 7,681,835 B2 * | 3/2010 | Simpson | B64C 3/20 244/123.14 |
| 7,810,757 B2 * | 10/2010 | Kirkwood et al. | 244/123.1 |
| 7,976,275 B2 * | 7/2011 | Miebach et al. | 416/61 |
| 8,079,818 B2 * | 12/2011 | Burchardt et al. | 416/223 R |
| 8,172,542 B2 * | 5/2012 | Hirano et al. | 416/230 |
| 2002/0053179 A1 | 5/2002 | Wycech | |
| 2004/0226255 A1 | 11/2004 | Holloway | |
| 2006/0070340 A1 * | 4/2006 | Fanucci et al. | 52/729.1 |
| 2007/0140861 A1 | 6/2007 | Wobben | |
| 2007/0264124 A1 * | 11/2007 | Mueller et al. | 416/230 |
| 2010/0135817 A1 * | 6/2010 | Wirt et al. | 416/226 |
| 2010/0162567 A1 * | 7/2010 | Kirkwood | B64C 3/28 29/897.2 |
| 2011/0008175 A1 * | 1/2011 | Gau | F03D 1/0675 416/233 |
| 2013/0055677 A1 | 3/2013 | Hayden et al. | |

OTHER PUBLICATIONS

Office Action mailed Mar. 29, 2013 in corresponding U.S. Appl. No. 13/663,296.

Response to Office Action filed Jul. 1, 2013 in corresponding U.S. Appl. No. 13/663,296.

Final Office Action mailed Aug. 21, 2013 in corresponding U.S. Appl. No. 13/663,296.

U.S. Appl. No. 13/480,361, Aerodynamic Fairing for a Wind Turbine and a Method of Connecting Adjacent Parts of Such a Fairing, filed May 24, 2012.

U.S. Appl. No. 13/560,806, Blade for a Turbine Operating in Water, filed Jul. 27, 2012.

U.S. Appl. No. 13/733,809, Wind Turbine Blade, filed Jan. 3, 2013.

\* cited by examiner

MODULAR STRUCTURAL COMPOSITE BEAM

CROSS-REFERENCE TO RELATED APPLICATIONS

This application is a continuation of U.S. patent application Ser. No. 13/663,296, filed on Oct. 29, 2012, and entitled "A MODULAR STRUCTURAL COMPOSITE BEAM," which is a continuation of Patent Cooperation Treaty International Patent Application PCT/GB2011/000661, filed Apr. 28, 2011, and entitled "A MODULAR STRUCTURAL COMPOSITE BEAM," which is incorporated by reference herein in its entirety, and which claims priority to Great Britain Patent Application 1007336.9, filed on Apr. 30, 2010.

BACKGROUND OF THE INVENTION

Field of the Invention

The present invention relates to a modular structural composite beam. In particular, the present invention relates to a modular structural composite beam for use in a wind turbine blade.

Description of the Related Art

Large wind turbine blades (>35 m in length) are typically constructed by forming a strengthening and stiffening cantilever beam or box spar inside an aerodynamic fairing. The current approach to manufacturing wind turbine blades is to produce each blade either as two half shells with a separate beam, or as two half shells with an integral beam. In both cases, the two half shells are bonded together along their edges to form the complete blade.

The structural beam comprises flanges at either end which are connected to one another by one, or more commonly two, shear webs. The flanges are made from predominantly unidirectional fibre reinforced plastic and the shear webs consist of predominantly multi-axial (+/−45°) fibre reinforced plastic.

It is well known in the art to make the beam by moulding the flanges within the half shells of the aerodynamic fairing and then bonding the flanges together with the shear webs when the aerodynamic fairings are joined together. Alternatively the beam is made by moulding a separate beam on a separate tool and then bonding the beam into the aerodynamic fairings when they are joined together.

These methods each have a number of shortcomings. Firstly, if the unidirectional flange of the beam is moulded within the fairing it is difficult to accurately control the quality of the flange material. This typically results in poor mechanical properties from the flange material leading, in turn, to increased mass required for engineering safety and therefore increased cost.

If the beam is made separately by moulding on a separate tool some of the above shortcomings may be avoided. However, the cost of the separate tool adds to the overall cost of the component.

In either case, if a new design or a slight variation in design is required, completely new tools need to be made thereby increasing prototyping time and cost also increasing the cost introducing new models. Similarly, if the use of automation is considered, the cost of automation will be high since then it must be capable of dealing with a number of different beam designs and geometries.

SUMMARY OF THE INVENTION

A design for a modular wind turbine blade is described in the applicant's published International patent application WO 2009/034291. This application discloses a wind turbine blade which comprises a plurality of standardised component parts which allow for greater design flexibility, for the blade as a whole, than traditional manufacture techniques. However, it only provides limited options for modification of the structural beam design. It is an aim of the present invention to provide a modular structural composite beam which provides improved design flexibility and quality and which can be used as part of a traditional wind turbine blade, as part of a modular wind turbine blade, or in other structural applications such as bridges.

Accordingly, in a first aspect the present invention provides a modular fibre reinforced plastic flange for a structural composite beam comprising: a body formed of a plurality of elongate elements arranged in an array such that the longitudinal axes of the elongate elements are substantially parallel to one another, wherein the dimensions of the body are substantially determined by the number and arrangement of the elongate elements in the array; and a skin member at least partially surrounding a plurality of the elongate elements in the array.

By constructing the body of the flange from a plurality of elongate elements with an outer skin the design of the flange can be readily varied by varying the size and configuration of the array of elongate elements and skin member. The provision of a skin member also provides improved shear load performance.

In a preferred embodiment the skin member fully surrounds the array of elongate elements to provide additional support and structural integrity.

The skin member preferably comprises first and second skin elements, the first skin element having a concave form and the second skin element being arranged to fit within the first skin element. This arrangement allows the body to be placed in the first skin element before the second skin element is fitted to complete the skin member. In this way the thickness of the body can be varied with little, or no, variation the dimensions of the skin member.

Preferably the skin member comprises a socket to receive, in use, a shear web. This provides a convenient method of attaching the flange to the shear web and transferring loads between the flange and shear web.

In a preferred embodiment at least two of the elongate elements comprise different materials. This allows the mechanical properties of the flange to be readily varied.

In order to further improve the shear load performance, at least one reinforcement layer is preferably at least partially located within the array of elongate elements.

In a second aspect, the present invention provides a structural composite beam comprising: a modular flange according to the first aspect of the invention; and a shear web connected to the skin member of the modular flange. In this way an improved and more versatile structural composite beam is provided.

The shear web preferably comprises a structural core located between two composite material layers to provide further structural integrity. The composite material layers are preferably multiaxial composite material. The shear web is advantageous as it can be assembled into the flange as an 'open' sandwich panel as the panel is terminated by the socket of the skin member. This means that the shear web(s) can be made in a continuous production process as opposed to a discrete moulding process (which would otherwise be required to 'close' the ends of the sandwich panel), thereby reducing production costs and increasing flexibility.

In a third aspect, the present invention provides a method of forming a modular fibre reinforced plastic flange for a structural composite beam comprising: forming a body from a plurality of elongate elements arranged in an array such that the longitudinal axes of the elongate elements are substantially parallel to one another, wherein the dimensions of the body are substantially determined by the number and arrangement of the elongate elements in the array; and connecting a skin member to the body such that the skin member at least partially surrounds a plurality of the elongate elements in the array.

The method preferably further comprises: selecting a number and arrangement of elongate elements to define the dimensions of the body; and selecting a skin member which is sized to substantially fit the dimensions of the body. In this way flanges of varying dimensions and mechanical properties can be readily formed from standardised components without the need to re-tool.

Preferably the skin member comprises first and second skin elements, the first skin element having a concave form and the second skin element being arranged to fit within the first skin element; the method further comprising: locating the body within the first skin element; and locating the second skin element within the first skin element to form a skin member which fully surrounds the body.

In a fourth aspect, the present invention provides a method of forming a structural composite beam comprising: using the method of the third aspect of the invention; and connecting at least one shear web to the skin member of the modular flange.

Preferably in the method of the third aspect of the invention, or in the method of the fourth aspect of the invention each component part of the modular flange or structural composite beam is made in a continuous production process. This reduces production costs and improves quality since continuous production processes are less time and labour intensive and more repeatable thereby reducing waste.

Before the methods of the third or fourth aspects of the invention are carried out, the elongate elements and skin member of the modular flange, and the at least one shear web of the structural composite beam, are preferably in a cured or semi-cured state and exhibit their final form. Thus, the shape and dimensions of the elongate elements, skin member and shear webs are substantially fixed before the modular flange or structural composite beam is assembled. In addition, the principal mechanical properties of the elongate elements, skin member and shear webs are substantially fixed before the modular flange or structural composite beam is assembled.

In a fifth aspect, the present invention provides a kit of parts for forming modular fibre reinforced plastic flanges comprising: a plurality of elongate elements suitable for forming a body comprising a plurality of elongate elements arranged in an array wherein the longitudinal axes of the elongate elements are substantially parallel to one another; and a plurality of skin members, wherein the plurality of skin members are sized to correspond to predetermined multiples of elongate elements. The kit thereby provides means for producing flanges of varying sizes and mechanical properties.

The elongate elements and skin members of the kit of parts are preferably in a cured or semi-cured state and exhibit their final form.

BRIEF DESCRIPTION OF THE DRAWINGS

An example of the present invention will now be described with reference to the following drawings in which.

DETAILED DESCRIPTION OF THE PREFERRED EMBODIMENT

Figure 1:
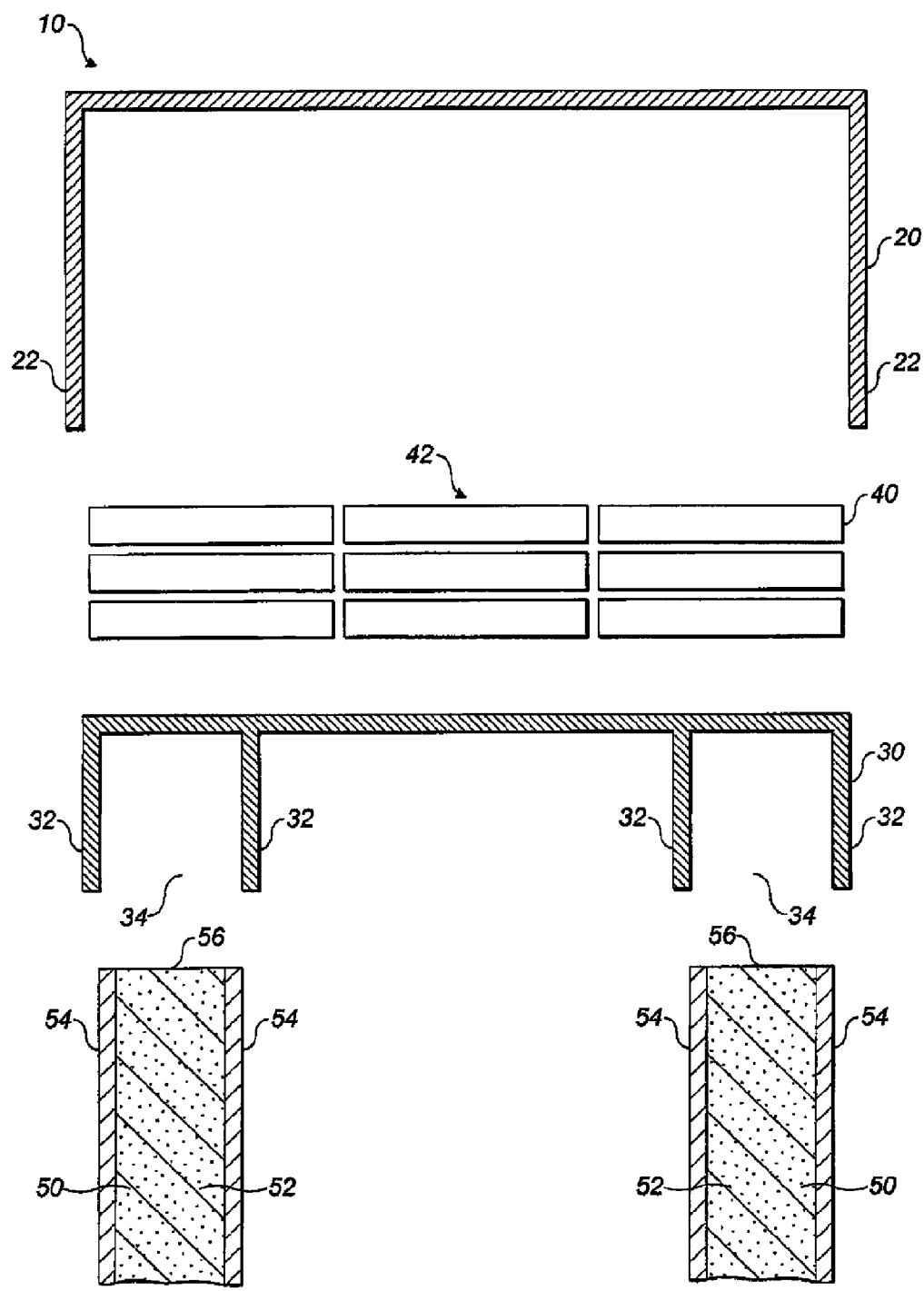
FIG. 1 shows an exploded schematic view of part of a modular structural composite beam.

FIG. 1 shows an exploded schematic view of a section of a modular structural composite beam 10. The beam 10 comprises first 20 and second 30 skin elements and a plurality of elongate elements 40. In addition, the beam 10 comprises two shear webs 50 each comprising a structural core 52 and outer skin layers 54.

The structural cores 52 may be made of any suitable material including PVC, PET, balsa wood or STYROFOAM or other structural core material widely known and used in the art. The outer skin layers 54 comprise predominantly multiaxial (±45°) fibre reinforced plastic. The outer skin layers 54 are attached to the cores 52 by an adhesive such as a structural adhesive (such as epoxy, polyurethane, acrylic, silicone) or with a resin such as a polyester, vinylester, epoxy or other structural thermosetting or thermoplasic resin.

The elongate elements 40 comprise predominantly uniaxial fibre reinforced plastic. The elongate elements are typically 'preformed' unidirectional composite materials such as pulltrusions or semi-cured prepreg or intermediate types of materials such that they exhibit their final shape or form before the flange 5 (see FIG. 2) is formed. As shown in FIG. 1, the elongate elements 40 are arranged in an array, in this case a three by three array, to form a body 42 which forms the main load bearing component of the flange 5. The elongate elements 40 are adhered together to form the body 42 either by structural adhesive or by laminating together with structural resin using a process such as hand laminating, vacuum infusion, vacuum consolidation or similar laminating processes used in the art.

The first and second skin elements 20, 30 each comprise predominantly multiaxial fibre reinforced plastic. The first skin element 20 has a U-shaped concave form and the second skin element 30 comprises projections 32 which define sockets 34 at each outer edge of the second skin element 30. The sockets 34 are sized to receive the edges 56 of the shear webs 50.

Figure 2:
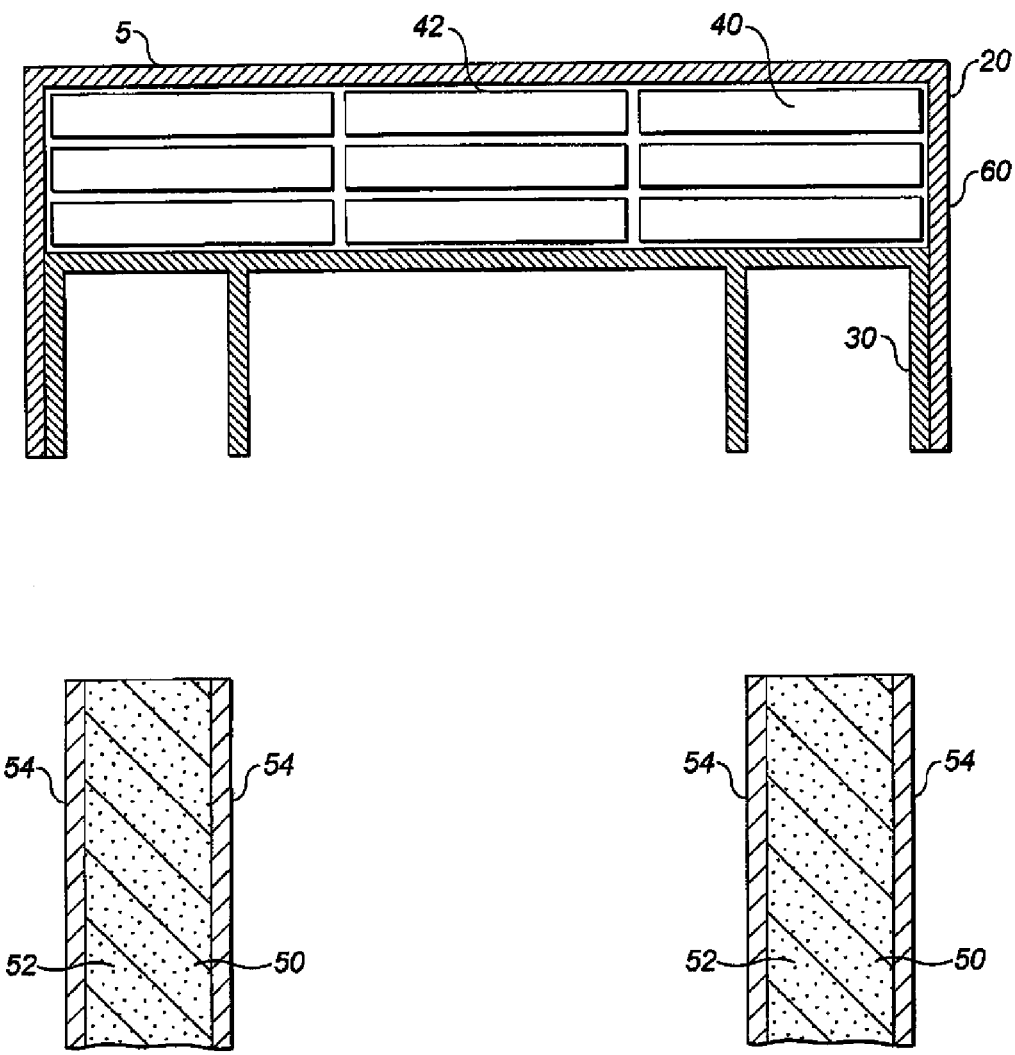
FIG. 2 shows a schematic sectional view of a modular fibre reinforced plastic flange and separate webs.

As shown in FIG. 2, in the assembled flange 5 the second skin element 30 fits within the first skin element 20. Together the two skin elements 20, 30 form skin member 60 which fully surrounds the body 42. In this example, 'fully surrounds' means that the skin member 60 encircles the body 42 but does not cover the ends of the body 42.

As is also shown in FIG. 2, the first and second skin elements 20, 30 are sized to fit the body 42. The dimensions of the body 42 are defined by the number and arrangement of elongate elements in the array. In the example shown in FIG. 2, the body 42 comprises a three by three array such that the depth of the body 42 is substantially the same as three times the depth of the elongate elements 40, and the width of the body 42 is substantially the same as three times the width of the elongate elements 40.

Figure 3:
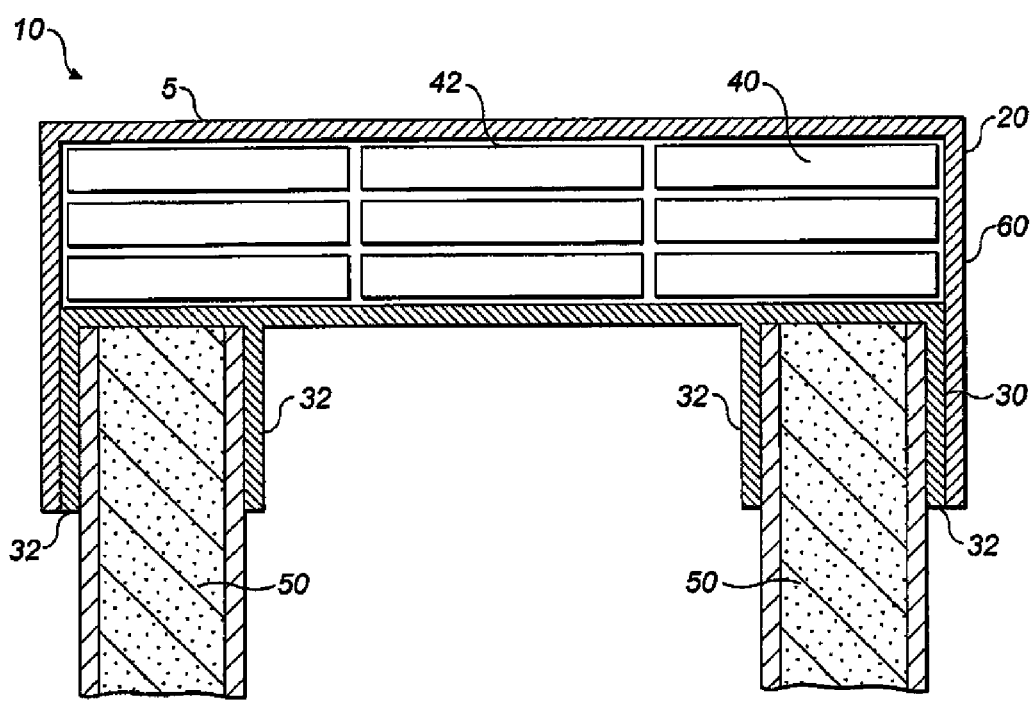
FIG. 3 shows a schematic sectional view of part of an assembled modular structural composite beam.

FIG. 3 shows the flange 5 assembled together with the shear webs 50. The shear webs fit into the sockets 34 and are attached by means of an adhesive such as a structural epoxy adhesive. As shown, location of the shear webs 50 in the sockets 34 'closes' the ends of the shear webs 50. In FIG. 3 only the upper section of a box beam 10 is shown. It will be appreciated that another flange 5 can be attached to the lower side of the shear webs 50 to form the complete box beam 10. In addition, the shear webs 50 can be of various depths to vary the depth of the box beam 10. This depth can be varied along the length of the beam to account, for example, for the taper of a wind turbine blade.

Figure 4:
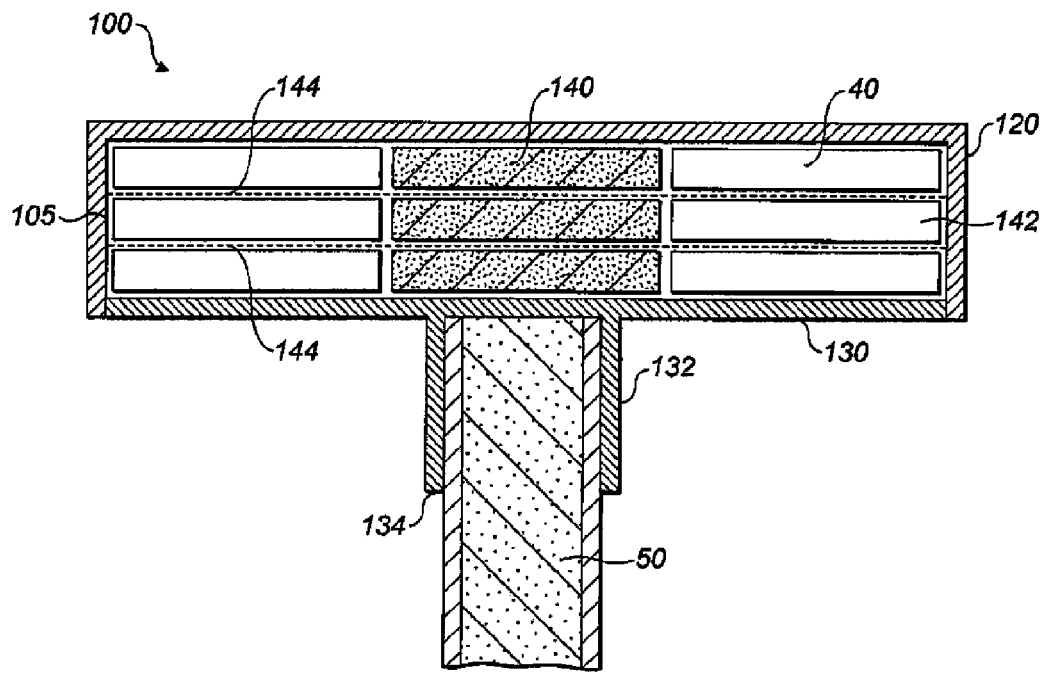
FIG. 4 shows a schematic sectional view of part of an alternative assembled modular structural composite beam.

FIG. 4 shows an alternative configuration of an upper section of a modular structural composite beam 100. In this case the beam 100 is an I-beam comprising only one shear web 50 located in a central socket 134 of second skin member 130. The elongate elements 40, 140 which form the body 142 of the flange 105 comprise different fibre reinforced plastic materials such that elongate elements 40 may comprise, for example, glass fibre reinforce plastic, and elongate elements 140 may comprise, for example, carbon fibre reinforced plastic. The arrangement of the different material elongate elements 40, 140 shown is FIG. 4 is an example only and any other arrangement may be selected depending of the mechanical properties desired.

The beam 100 further comprises reinforcement layers 144 located between the layers of elongate elements 40, 140 in the body 42. These reinforcement layers comprise predominantly multiaxial (□±45°) fibre reinforced plastic and provide additional shear strength to the flange 105. Reinforcement layers 144 may be included in any of the modular structural composite beam configurations described herein.

Figure 5:
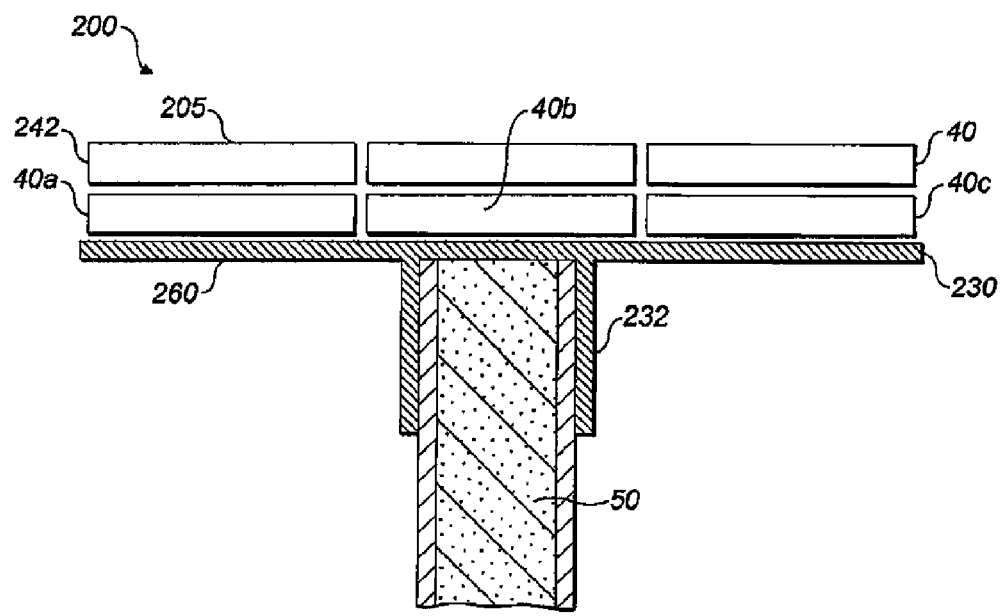
FIG. 5 shows a schematic sectional view of part of a further alternative assembled modular structural composite beam.

FIG. 5 shows a further alternative configuration of an upper section of a modular structural composite beam 200. elongate elements 40 and the skin member 260 comprises only a single skin element 220 which partially surrounds elongate elements 40a, 40b and 40c of the array.

It will be appreciated that any number of elongate elements 40, 140 may be included in the array which forms the body 42, 142, 242, and any number of different fibre reinforced plastic materials in any desired arrangement may be selected for the elongate elements. In this way the mechanical properties of the flange 5, 105, 205 may be varied as desired.

Referring again to FIG. 2, if the width of the body 42 stays the same (three elongate elements wide) but the depth changes (for example, two elongate elements deep) the same skin elements 20, 30 can be used since the difference in depth is accommodated by the fact that the second skin element 30 fits into the first skin element 20 until it reaches the body 42. If desired, the sides 22 of the first skin element 20 may be trimmed to remove the overlap with the projections 32 of the second skin element 30. Alternatively, a greater depth body 42 (for example, four or more elongate elements deep) can be accommodated by the variable depth capability provided by the interaction of the first and second skin elements 20, 30. In this case the projections 32 of the second skin element 30 may optionally be trimmed to remove the overlap with the sides 22 of the first skin element 20.

If the width of the body 42 varies (for example, two elongate elements wide) it is desirable to provide skin elements 20, 30 of a suitable size to fit the width of the body 42. The elongate elements 40 preferably have standard dimensions so that a set of standardised sizes of skin elements 20, 30 can be provided to fit various different arrays of elongate elements.

The fibre reinforced plastic components described above are typically glass fibre reinforced plastics or carbon fibre reinforced plastics as are well known in the art. However any other suitable fibre reinforced plastic material may be used.

What is claimed is:

1. A structural composite beam comprising:
   two modular bodies each formed of a plurality of pre-cured elongate elements each formed from a composite material, the plurality of elongate elements extending longitudinally the length of the beam, the plurality of elongate elements being arranged side-by-side, on top of one another, or side-by-side and on top of one another in an array such that the longitudinal axes of the plurality of elongate elements are parallel to one another, wherein the dimensions of each modular body are substantially determined by the number and arrangement of the plurality of elongate elements in the array;
   a first modular skin member and a second modular skin member respectively surrounding the array of each body, each modular skin member being configurable to accommodate a variable number or arrangement, or a variable number and arrangement, of elongate elements in the respective array, and each modular skin member extending longitudinally along a substantial portion of the length of a plurality of elongate elements in the respective array, wherein the first modular skin member comprises sides that extend along opposing edges of the respective bodies, the opposing edges being perpendicular to the length of the plurality of elongate elements, wherein the second modular skin member comprises projections that define a socket, and wherein the sides of the first modular skin member at least partially overlap the projections of the second modular skin member; and
   a shear web inserted and fixed into the respective socket on each of the two modular bodies to form the complete beam.

2. A structural composite beam as claimed in claim 1, wherein each skin member fully surrounds the array of elongate elements.

3. A structural composite beam as claimed in claim 2, wherein each skin member comprises first and second skin elements, the first skin element having a concave form and the second skin element being arranged to fit within the first skin element.

4. A structural composite beam as claimed in claim 1, further comprising at least one reinforcement layer at least partially located within the array of elongate elements.

5. A structural composite beam as claimed in claim 1, wherein the shear web comprises a structural core located between two composite material layers.

6. A method of manufacturing a structural composite beam comprising:
   forming two modular bodies each from a plurality of pre-cured elongate elements each formed from a composite material, the plurality of elongate elements extending longitudinally the length of the beam, the plurality of elongate elements being arranged side-by-side, on top of one another, or side-by-side and on top of one another in an array such that the longitudinal axes of the plurality of elongate elements are parallel to one another, wherein the dimensions of each modular body are substantially determined by the number and arrangement of the plurality of elongate elements in the array;

surrounding the array of each body with a first modular skin member and a second modular skin member configurable to accommodate a variable number or arrangement, or a variable number and arrangement, of elongate elements in the respective array, and each modular skin member extending longitudinally along a substantial portion of the length of a plurality of elongate elements in the respective array, wherein the first modular skin member comprises sides that extend along opposing edges of the respective bodies, the opposing edges being perpendicular to the length of the plurality of elongate elements, wherein the second modular skin member comprises projections that define a socket, and wherein the sides of the first modular skin member at least partially overlap the projections of the second modular skin member; and forming a shear web and inserting and fixing the shear web into the respective socket on each of the two modular bodies to form the complete beam.

7. A method of forming a structural composite beam as claimed in claim 6, further comprising:

selecting a number and arrangement of elongate elements to define the dimensions of the body; and selecting a skin member which is sized to substantially fit the dimensions of the body.

8. A method of forming a structural composite beam as claimed in claim 7, wherein the first skin element comprises a concave form and the second skin element is arranged to fit within the first skin element; the method further comprising:

locating the respective body within the first skin element; and locating the second skin element within the first skin element to form a skin member which fully surrounds the respective body.

9. A method of forming a structural composite beam as claimed in claim 6, wherein each of the elongate elements and skin members is made in a continuous production process.

10. A method of forming a structural composite beam as claimed in claim 6, wherein the modular bodies, the first modular skin members, the second modular skin members, and the shear web of the structural composite beam are made in a continuous production process.

11. A method of forming a structural composite beam as claimed in claim 6, wherein, before forming each body, the respective skin members, and the shear web of the structural composite beam are in a cured or semi-cured state and exhibit their final form.

12. A kit of parts for forming modular fibre reinforced plastic flanges comprising:

a plurality of pre-cured elongate elements, each formed from a composite material, suitable for forming two modular bodies each comprising a plurality of elongate elements extending longitudinally the length of the beam, the plurality of elongate elements in each body being arranged in an array side-by-side, on top of one another, or side-by-side and on top of one another, wherein the longitudinal axes of the plurality of elongate elements are parallel to one another, and wherein the dimensions of each respective modular body are substantially determined by the number and arrangement of the plurality of elongate elements in the array;

a plurality of first modular skin members and second modular skin members, wherein the plurality of modular skin members are configurable to accommodate a variable number or arrangement, or a variable number and arrangement, of elongate elements in the respective array, and each modular skin member extending longitudinally along a substantial portion of the length of a plurality of elongate elements in the respective array, wherein the first modular skin members each comprise sides that extend along opposing edges of the respective bodies, the opposing edges being perpendicular to the length of the plurality of elongate elements, wherein the second modular skin members each comprise projections that define a socket, and wherein the sides of each first modular skin member at least partially overlap the projections of one of the second modular skin members when assembled; and a shear web to be inserted and fixed into the respective socket on each of the two modular bodies to form the complete beam.

13. A kit of parts as claimed in claim 12, wherein the skin members are in a cured or semi-cured state and exhibit their final form.

* * * * *